3,319,728
AUTOMATIC WEIGHER AND ROTARY MOLD CONVEYOR FOR LIQUID METAL
Fritz Agne Johansson, Erik Alvar Lundgren, and Lars Gunnar Bonde Magnuson, Skelleftehamn, Sweden, assignors to Bolidens Gruvaktiebolag, Stockholm, Sweden, a joint-stock company limited of Sweden
Filed July 13, 1964, Ser. No. 382,259
Claims priority, application Sweden, July 23, 1963, 8,153/63
5 Claims. (Cl. 177—53)

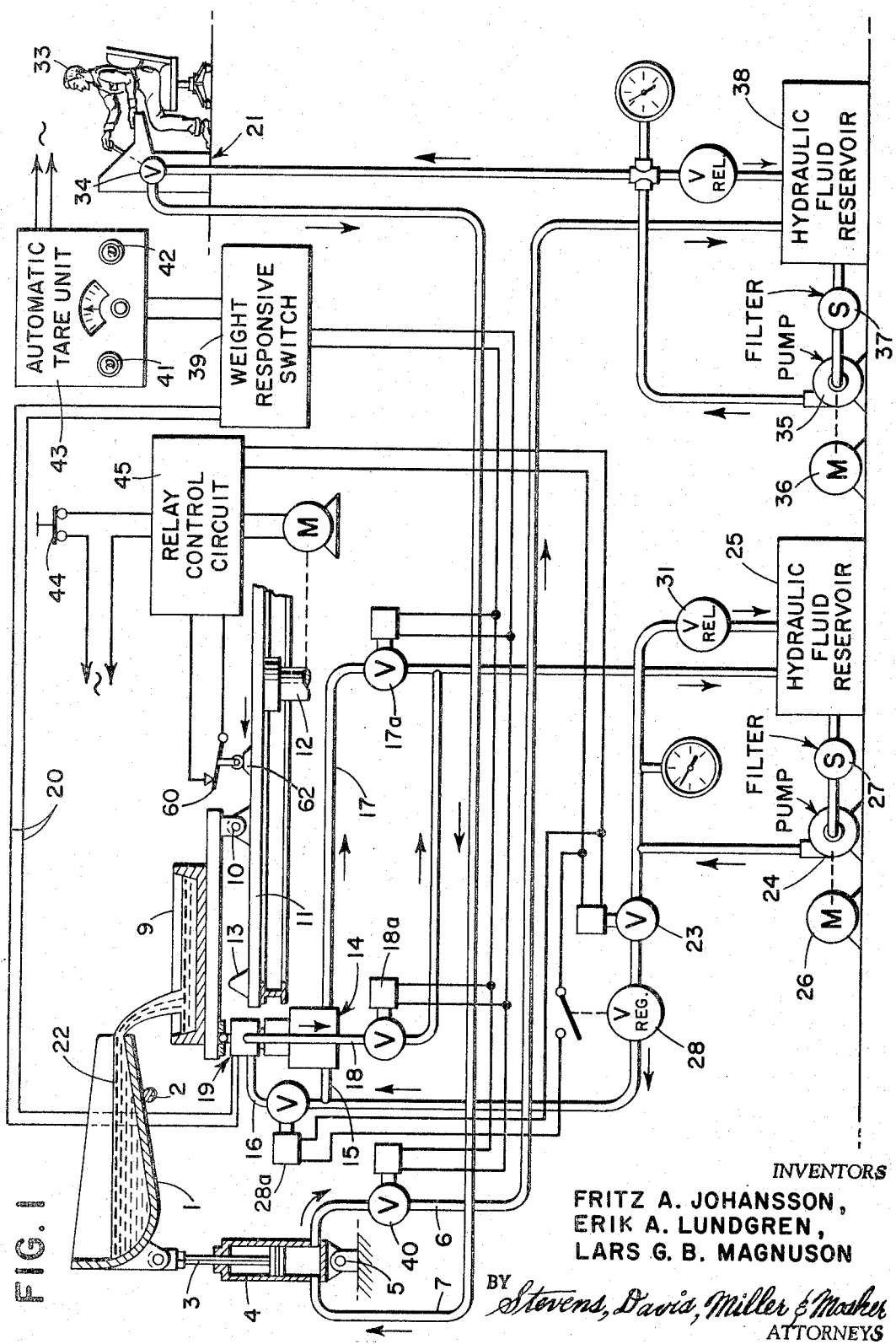

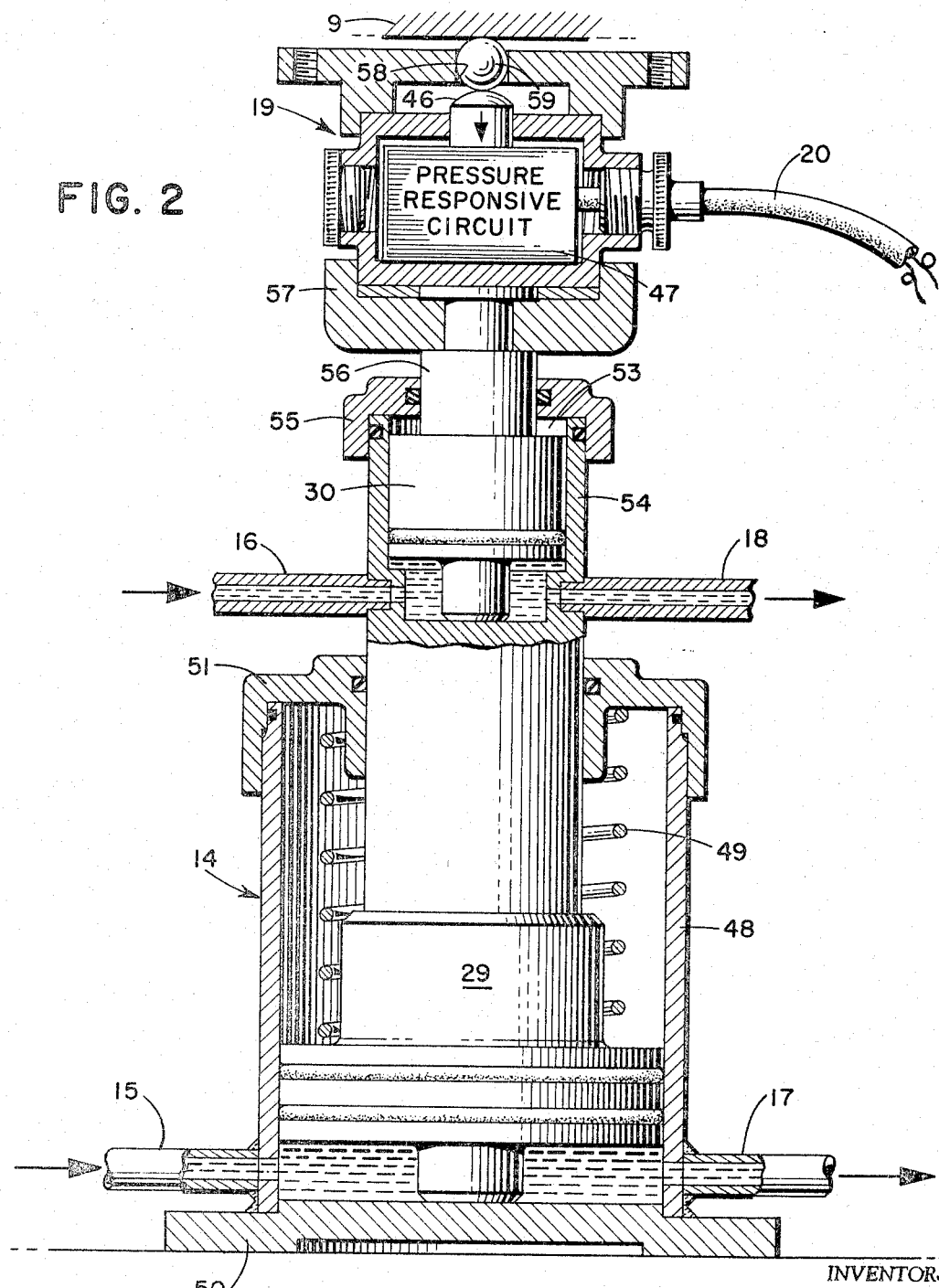

The present invention relates to a process for weighing predetermined amounts of metal in a liquid state which is poured from a ladle into a mold.

In handling liquid metal in molding metal blocks or the like in open molds, there are great problems in connection with adapting the quantity of metal poured into the mold so that the block will have the same final weight. Normally, molding is manually controlled and variations in weight of up to 50 kgs. or more can often occur. Especially in molding anode blocks, this unevenness can mean a loss in subsequent electrolysis, from where the remainder of the heaviest anode blocks must be withdrawn for re-molding.

It is now suggested therefore that molding be carried out simultaneously with weighing. In series production, conveyors are often used on which a plurality of molds are stored and fed in succession under the ladle to be filled with molten metal.

With respect to the large constructions which are necessary to be able to support the heavy molds, difficulties arise in maintaining sufficiently accurate and uniform precision in adjusting each mold under the ladle in order to be able to carry out sufficiently accurate storage for weighing the successively advanced molds. It often occurs that the level of the conveyor path varies for each mold that is advanced.

Consequently, it is one of the purposes of the invention to adopt such measures in connection with weighing that weighing is independent of these variations of level.

The above and other inconveniences are eliminated by the invention which is principally characterized in that the mold is raised into weighing position resting on a force measuring device with an electrical out-put-signal (e.g., a piezoelectric or electromechanical transducing means) and that signals from this are used to control the ladle in such a way that it pours metal until loading of the force measuring device has reached a predetermined value, at which moment the molding process is concluded.

The invention will be further explained below with reference to an embodiment diagrammatically illustrated in the attached drawing and in connection with this, further characterizing features of the invention will be set forth.

FIG. 1 shows a schematic representation of the present invention with portions of the device being shown in cross-section; and FIG. 2 shows a vertical cross section of a pressure cylinder device for raising the mold into molding position including the force measuring device of the present invention.

With reference to FIG. 1, the reference numeral 1 is used to designate a ladle which is pivotally mounted around a bearing shaft 2 and which rests on a pivotally mounted piston rod 3 by means of which the ladle is caused to pivot around its bearing point. The piston rod 3 operates in turn in a hydraulic pressure cylinder 4 which is pivotally suspended at 5 and to which fluid lines 6 and 7 are connected.

In the same figure, reference numeral 9 is used to designate a mold, i.e., an ingot mold, which is pivotally mounted in a bearing 10 which in turn is carried by an underlying support preferably of a movable kind. This support can possibly comprise a conveyor operating at right angles to the work plane of the ladle so that a plurality of molds can be intermittently moved to the molding position under the ladle 1. According to a specially preferred embodiment of the invention, the support 11 comprises a kind of carousel means operating around a vertical shaft 12.

The support is provided with a bracket or the like 13 for each ingot mold 9 placed thereon, on which the ingot mold normally rests in a lowered position.

As can be seen from the figure, a double pressure cylinder means generally designated by the reference numeral 14 is located in the mold position under the ingot mold 9 situated there. The details of this double pressure cylinder means will later be described in connection with FIGURE 2. Fluid lines 15, 16, 17 and 18 are connected to this double-pressure cylinder means. In addition, it can be mentioned that this double-pressure cylinder means carries a force measuring device 19 which is a suitable piezoelectric or electromechanical transducer connected to an electrical line 20.

The principle of the invention is to raise the force measuring device 19, e.g., a piezoelectric or electromechanical transducer, by means of the pressure cylinder means to a predetermined position and thereafter to a further predetermined smaller distance so that the mold finally, with certainty, rests completely on the force measuring device instead of on the bracket member 13. Control of this movement is executed from a control center 21, from where the drive means of the ladle is also actuated so that the ladle commences to pour the molten metal 22 into the ingot mold 9 when the latter rests completely on the force measuring device 19.

When a predetermined quantity of, for example, molten copper 22 has been poured into the ingot mold 9, molding is automatically interrupted. The mold table 11 commences to rotate until the next ingot mold 9 enters the mold position. When the mold table stops, the electric valve 23 receives an electric impulse. Fluid is then pumped from the pump unit 24 connected to a fluid vessel 25, an electric motor 26 and fluid screen 27, through the valve 23 to the valve 28, which is then opened to a lower piston 29 in the double pressure piston means. The valve 28 is hydraulically adjustable. It is therewith assumed that this valve is adjusted, for example for five times atmospheric pressure.

The piston 29 rises with the force measuring device 19. Another piston 30 operates in the piston rod on the piston 29. When the force measuring device contacts the ingot mold beam, the fluid pressure is increased. When the pressure becomes five times atmospheric pressure the valve 28 is actuated to close off the fluid line 15 between the valve and piston 29 and to open the fluid line 16 between the valve and piston 30. Piston 30 then rises by the whole of its stroke length, about 10 mm., whereby the ingot mold 9 is raised from its support and the load rests completely on the force measuring device 19. In this position taring takes place, i.e., the instruments are adjusted to zero to deduct for the weight of the mold. After this zeroing, molding can take place. It may also be pointed out that the pump 24 pumps fluid during the whole of this operation to the piston 30. Thus the piston is always in its upper position but the overflow valve 31 opens when pressure in valve 23 becomes higher than the pressure to which that valve is adjusted. This pressure must be greater than the pressure of the maximal weight divided by the area of piston 30 so that the load will remain in the raised position.

When taring is finished, the machine operator 33 opens the manual valve 34 so that the pump units 35, 36, 37 and 38 pumps fluid to cylinder 4. The ladle 1 is raised and molten metal is poured into the ingot mold 9. When the weight of the molten metal reaches that adjusted on the weight responsive switch 39, the solenoid operated valve 40 receives an electrical impulse and opens. This valve 40 is connected to the cylinder 4. The fluid flows out to the fluid vessel 38 and as a consequence of this the ladle is lowered and molding ceases.

The valve 23 now receives a switching pulse and opens to the fluid vessel 25. When valve 23 opens, the pressure drops and the valve 28 is actuated so that both the pistons 30 and 29 now will be connected to the fluid vessel 25. The ingot mold 9 and the beam 10 are lowered onto their supports on the mold table 11. In this position rotation of the mold table 11 is started and stops by the action of means such as cam 62 and cam actuated switch 60, when the next ingot mold 9 has entered the mold position.

The weighing equipment itself comprises, in principle, apart from the load transmitter on its two lift cylinders 30 and 29, a weight responsive switch 39 with limit value contacts for controlling the electromagnetic solenoid valve 40 and signal lamps 41 and 42, an automatic taring unit 43 and control switches 44 with relay equipment 45.

With simultaneous reference to FIG. 2, which shows the double pressure piston means 14 in more detail, the load transmitter 19 consists of a load-receiving steel pin 46 with four special resistors 47 whose own value depends on mechanical strain and are adapted in such a way that on loading of the pin 46 their length is altered, whereby their resistance ratios are also altered. The four resistors 47, which have been schematically represented by the block indication of the pressure responsive circuit, are connected in a known manner as a Wheatstone bridge circuit and fed with an alternating voltage.

The output voltage of the bridge, which will be proportional to the resistance change, i.e., the weight load, is measured by a servo controlled potentiometer instrument in the weight responsive switch 39, the measuring bridge of which is fed from the same electrical source as the resistor 47.

In the circuit of the measuring bridge the automatic tare unit 43 is included which on taring, i.e., loading with empty ingot mold 9, returns the servo of the weight responsive switch 39 to zero position. The taring is time controlled and disconnected after the adjusted time. During taring, the signal lamp 41 is lit.

The weighing process embraces the following steps:
The mold carousel 11 with, for example, 22 ingot molds 9 uniformly distributed on its periphery, is started by the control switch 44 and relay 45 and an empty ingot mold 9 is advanced into position under the ladle 1.

After the mold carousel reached a position wherein an empty mold has been properly positioned the carousel is stopped by the interaction of the previously mentioned cam 62 and cam-operated switch 60, weighing is commenced. The magnetic valve 23 receives an electrical impulse and the piston 29 raises the weighing device 19 towards the ingot mold beam, however, without raising it from its support. When the pressure in line 15 exceeds a certan value, the valve 28a switches the fluid supply to the upper piston, which has a limited stroke length of about 10 mm. The piston of this cylinder raises one end of the ingot mold 9 from the support 11, i.e. the mold table, at the same time as the taring device 43 becomes operative and tares away the weight of the ingot mold 9.

When taring has been completed, signal lamp 41 is extinguished and signal lamp 42 is lit indicating molding can begin. Molding takes place by actuation of the manual valve 34. After the adjusted weight has been reached, a limit value contact in the weight responsive switch 39 closes the circuit to the electromagnetic valve 40, whereby the fluid in the cylinder 4 supporting the ladle is emptied and molding is interrupted.

When the mold table 11 is again started in order to advance a new ingot mold 9, the first circuit to the magnetic mold 23 is opened and exhaust valves 17a and 18a are energized to release the fluid from cylinder 14, and the ingot valve is laid down on the bracket 13 of the mold table.

After a certain time delay controlled by the relay 45, the machinery of the mold table 11 is started and advances one step with a new ingot mold, after which a new weighing and molding sequence can take place.

To further clarify the double pressure piston means, reference is made to FIG. 2 which to a large extent shows the weight receiving details in the weighing system.

The piston 29 operates in a pressure cylinder designated by the reference numeral 48 with the inlet line 15 for pressure oil and likewise the outlet line 17. The piston is biased by a coil spring 49 towards its lower position and the cylinder is provided with a bottom plate 50 and a lid 51 through which the piston rod 52 of the piston 29 projects well sealed.

A recess 53 is made in the end of the projecting part of the piston rod 52, forming a second pressure oil cylinder 54 in which the piston 30 operates. The inlet line 16 leads to the cylinder 54, from which runs the outlet line 18. The end of the pressure cylinder 54 is closed by a lid 55, through which the piston rod 56 of the piston 30 tightly projects. A support plate 57 is fixed to the piston rod 56, carrying the force measuring device 19 which was earlier described. Above this force measuring device is a pressure or load receiving ball 59 in a socket 58, which ball directly receives the ingot mold resting thereon.

The invention is not limited to the embodiment shown and described but can be varied in many ways within the spirit and scope of the basic inventive idea.

Having now described the invention, what we claim as new and desire to secure by Letters Patent is:

1. An apparatus for weighing predetermined amounts of metal in a liquid state comprising a molding station including a ladle and means to rotate said ladle to pour liquid metal therefrom, a plurality of molds, means to sequentially position said molds beneath the said ladle in said molding station, each said mold being pivotally mounted by one end on said means, a force measuring device, the free end of said mold in said molding station being positioned directly above said force measuring device, said force measuring device being mounted in such a way to raise said mold to substantially bear the entire weight thereof thereon, means within said force measuring device for measuring the increase in weight of the mold determined by the amount of molten metal placed therein.

2. An apparatus according to claim 1 in which said force measuring device is mounted on a vertically displaceable double piston cylinder arrangement, the first of said piston cylinders having a sufficient range to place said force measuring device to contact said mold, said second piston cylinder having such a range as to lift said mold so that said force measuring device will substantially bear the entire weight thereof thereon, said first piston having a greater area than said second piston.

3. An apparatus according to claim 2 in which both said piston cylinder portions of said double piston cylinder are selectively connected to a source of fluid under pressure through valve means, said valve means being arranged to allow pressure to pass first to said lower piston until a predetermined pressure has been attained and thereafter automatically interrupt this supply of pressure to said first piston cylinder arrangement while maintaining pressure on said piston and to effect a supply of fluid under pressure to said second piston so that it is raised to exert to the full extent of its stroke length.

4. An apparatus according to claim 3 in which said valve comprises a pressure controlled valve operatively connected to said double piston cylinder arrangement in such a way that the lower piston is subjected to a lower pressure than the upper piston.

5. An apparatus for weighing a predetermined amount of metal in a liquid state as it is poured from a ladle into a mold comprising a molding station having a ladle filled with molten metal, means to control the pouring of said metal from said ladle, a plurality of molds, means to sequentially position said molds beneath said ladle, a force measuring device positioned in said molding station beneath said molds to be brought into contact therewith, a double piston cylinder arrangement, said force measuring device being mounted on said double piston cylinder arrangement, a source of fluid under pressure connected to each said piston cylinder of said double piston cylinder arrangement, valve means controlling the distribution of fluid to each said piston cylinder, automatic tare means to balance said system by deducting the weight of the mold and creating a null condition, and automatic means responsive to said force measuring device obtaining a predetermined value to stop the pouring of molten metal from said ladle.

References Cited by the Examiner

UNITED STATES PATENTS

| | | | |
|---|---|---|---|
| 702,634 | 6/1902 | Coleman | 177—60 |
| 2,488,347 | 11/1949 | Thurston | 177—141 |
| 2,844,350 | 7/1958 | Higham et al. | 177—53 |
| 3,200,451 | 8/1965 | Worswick | 22—77 |

RICHARD B. WILKINSON, *Primary Examiner.*